United States Patent
Li et al.

(10) Patent No.: US 12,452,017 B2
(45) Date of Patent: Oct. 21, 2025

(54) CONTROL RESOURCE SET PRECODING INDICATION

(71) Applicant: QUALCOMM Incorporated, San Diego, CA (US)

(72) Inventors: Qiaoyu Li, Beijing (CN); Chao Wei, Beijing (CN); Jing Lei, San Diego, CA (US); Huilin Xu, Temecula, CA (US); Peter Pui Lok Ang, San Diego, CA (US); Hao Xu, Beijing (CN); Wanshi Chen, San Diego, CA (US); Jing Dai, Beijing (CN); Min Huang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 600 days.

(21) Appl. No.: 17/759,795

(22) PCT Filed: Feb. 10, 2020

(86) PCT No.: PCT/CN2020/074620
§ 371 (c)(1),
(2) Date: Jul. 29, 2022

(87) PCT Pub. No.: WO2021/159232
PCT Pub. Date: Aug. 19, 2021

(65) Prior Publication Data
US 2023/0067546 A1 Mar. 2, 2023

(51) Int. Cl.
*H04L 5/00* (2006.01)
*H04W 72/23* (2023.01)

(52) U.S. Cl.
CPC ........... *H04L 5/0053* (2013.01); *H04W 72/23* (2023.01)

(58) Field of Classification Search
CPC ... H04L 5/0053; H04L 25/0228; H04W 72/23
See application file for complete search history.

(56) References Cited

U.S. PATENT DOCUMENTS

2011/0255483 A1* 10/2011 Xu ..................... H04L 25/0232
370/328
2018/0324770 A1* 11/2018 Nogami ................. H04L 5/005
(Continued)

FOREIGN PATENT DOCUMENTS

EP        3471297 A1    4/2019
WO    2018204333 A1   11/2018
(Continued)

OTHER PUBLICATIONS

NTT Docomo: "Summary of Key Aspects for PDCCH Structure", 3GPP TSG RAN WG1 Meeting 90bis, R1-1718833, 3rd Generation Partnership Project, Mobile Competence Centre, 650, Route Des Lucioles, F-06921 Sophia-Antipolis Cedex, France, vol. RAN WG1, No. Prague, CZ, Oct. 9, 2017-Oct. 13, 2017, Oct. 9, 2017, pp. 1-19, XP051353313, p. 4/19.
(Continued)

*Primary Examiner* — Liem H. Nguyen
(74) *Attorney, Agent, or Firm* — Harrity & Harrity LLP

(57) ABSTRACT

Various aspects of the present disclosure generally relate to wireless communication. In some aspects, a user equipment (UE) may receive a configuration for a control resource set (CORESET) that indicates a precoder granularity unit over which a same precoding is used for resources of the CORESET. The precoder granularity unit may be greater than a resource element group bundle of the CORESET and less than contiguous resource blocks of the CORESET. The UE may monitor for one or more physical downlink control channel candidates according to the configuration. Numerous other aspects are provided.

30 Claims, 12 Drawing Sheets

(56) References Cited

U.S. PATENT DOCUMENTS

| | | | |
|---|---|---|---|
| 2018/0375628 A1* | 12/2018 | Lee | H04L 5/0053 |
| 2019/0013919 A1* | 1/2019 | Zhang | H04W 72/542 |
| 2019/0140776 A1* | 5/2019 | Seo | H04B 7/0456 |
| 2019/0335425 A1* | 10/2019 | Seo | H04L 5/0053 |
| 2019/0349904 A1* | 11/2019 | Kwak | H04L 69/324 |
| 2019/0349964 A1* | 11/2019 | Liou | H04B 7/0626 |
| 2019/0357194 A1* | 11/2019 | Hwang | H04L 5/0094 |
| 2020/0092073 A1* | 3/2020 | Papasakellariou | H04L 5/0094 |
| 2020/0178236 A1* | 6/2020 | Gong | H04L 5/0064 |
| 2021/0159952 A1* | 5/2021 | Nunome | H04B 7/0456 |
| 2022/0046691 A1* | 2/2022 | Kim | H04L 5/0055 |
| 2022/0167193 A1* | 5/2022 | Kim | H04W 72/044 |
| 2022/0239424 A1* | 7/2022 | Tiirola | H04L 5/0091 |
| 2023/0198721 A1* | 6/2023 | Gao | H04L 5/0082 |
| | | | 370/329 |

FOREIGN PATENT DOCUMENTS

| | | |
|---|---|---|
| WO | 2018225998 A1 | 12/2018 |
| WO | 2019029528 A1 | 2/2019 |
| WO | 2019062604 A1 | 4/2019 |
| WO | 2019139300 A1 | 7/2019 |
| WO | 2019174593 A1 | 9/2019 |

OTHER PUBLICATIONS

Supplementary European Search Report—EP20918253—Search Authority—Munich—Sep. 27, 2023.
International Search Report and Written Opinion—PCT/CN2020/074620—ISA/EPO—Nov. 12, 2020.
NTT Docomo, Inc: "Offline Summary for AI 7.1.3.1.1 PDCCH Structure", 3GPP TSG RAN WG1 Meeting #92bis, R1-1805537, Sanya, China, Apr. 16-20, 2018, 27 Pages (pp. 9, 12-13, 16).

* cited by examiner

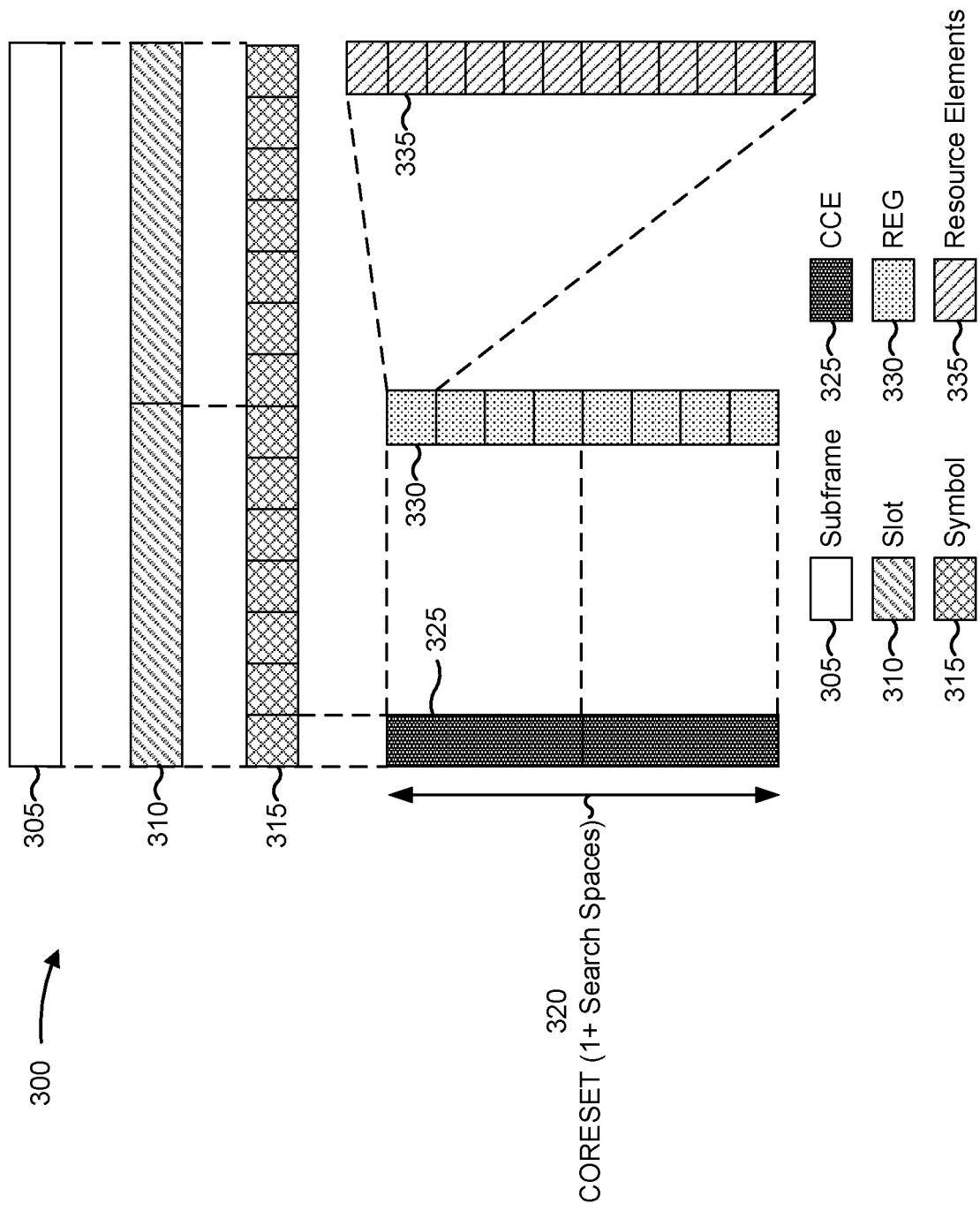

CONTROL RESOURCE SET PRECODING INDICATION

CROSS-REFERENCE TO RELATED APPLICATION

This patent application is a 371 National Phase of Patent Cooperation Treaty (PCT) Patent Application No. PCT/CN2020/074620, filed on Feb. 10, 2020, entitled "CONTROL RESOURCE SET PRECODING INDICATION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for control resource set precoding indication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a configuration for a control resource set (CORESET) that indicates a precoder granularity unit over which a same precoding is used for resources of the CORESET, wherein the precoder granularity unit is greater than a resource element group (REG) bundle of the CORESET and less than contiguous resource blocks of the CORESET; and monitoring for one or more physical downlink control channel (PDCCH) candidates according to the configuration.

In some aspects, a method of wireless communication, performed by a base station (BS), may include determining, for a CORESET, a precoder granularity unit over which a same precoding is used for resources of the CORESET, wherein the precoder granularity unit is greater than an REG bundle of the CORESET and less than contiguous resource blocks of the CORESET; and transmitting, to a UE, a configuration that indicates the precoder granularity unit, to enable the UE to monitor for one or more PDCCH candidates according to the configuration.

In some aspects, a BS for wireless communication may include memory and one or more processors operatively coupled to the memory. The memory and the one or more processors may be configured to receive a configuration for a CORESET that indicates a precoder granularity unit over which a same precoding is used for resources of the CORESET, wherein the precoder granularity unit is greater than an REG bundle of the CORESET and less than contiguous resource blocks of the CORESET; and monitor for one or more PDCCH candidates according to the configuration.

In some aspects, a BS for wireless communication may include memory and one or more processors operatively coupled to the memory. The memory and the one or more processors may be configured to determine, for a CORESET, a precoder granularity unit over which a same precoding is used for resources of the CORESET, wherein the precoder granularity unit is greater than an REG bundle of the CORESET and less than contiguous resource blocks of the CORESET; and transmit, to a UE, a configuration that indicates the precoder granularity unit, to enable the UE to monitor for one or more PDCCH candidates according to the configuration.

In some aspects, a non-transitory computer-readable medium may store one or more instructions for wireless communication. The one or more instructions, when executed by one or more processors of a UE, may cause the one or more processors to: receive a configuration for a CORESET that indicates a precoder granularity unit over which a same precoding is used for resources of the CORESET, wherein the precoder granularity unit is greater than an REG bundle of the CORESET and less than contiguous resource blocks of the CORESET; and monitor for one or more PDCCH candidates according to the configuration.

In some aspects, a non-transitory computer-readable medium may store one or more instructions for wireless communication. The one or more instructions, when executed by one or more processors of a BS, may cause the one or more processors to: determine, for a CORESET, a precoder granularity unit over which a same precoding is used for resources of the CORESET, wherein the precoder granularity unit is greater than an REG bundle of the CORESET and less than contiguous resource blocks of the CORESET; and transmit, to a UE, a configuration that indicates the precoder granularity unit, to enable the UE to monitor for one or more PDCCH candidates according to the configuration.

In some aspects, an apparatus for wireless communication may include means for receiving a configuration for a CORESET that indicates a precoder granularity unit over which a same precoding is used for resources of the CORESET, wherein the precoder granularity unit is greater than an REG bundle of the CORESET and less than contiguous resource blocks of the CORESET; and means for monitoring for one or more PDCCH candidates according to the configuration.

In some aspects, an apparatus for wireless communication may include means for determining, for a CORESET, a precoder granularity unit over which a same precoding is used for resources of the CORESET, wherein the precoder granularity unit is greater than an REG bundle of the CORESET and less than contiguous resource blocks of the CORESET; and means for transmitting, to a UE, a configuration that indicates the precoder granularity unit, to enable the UE to monitor for one or more PDCCH candidates according to the configuration.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 3A illustrates an example resource structure for wireless communication, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
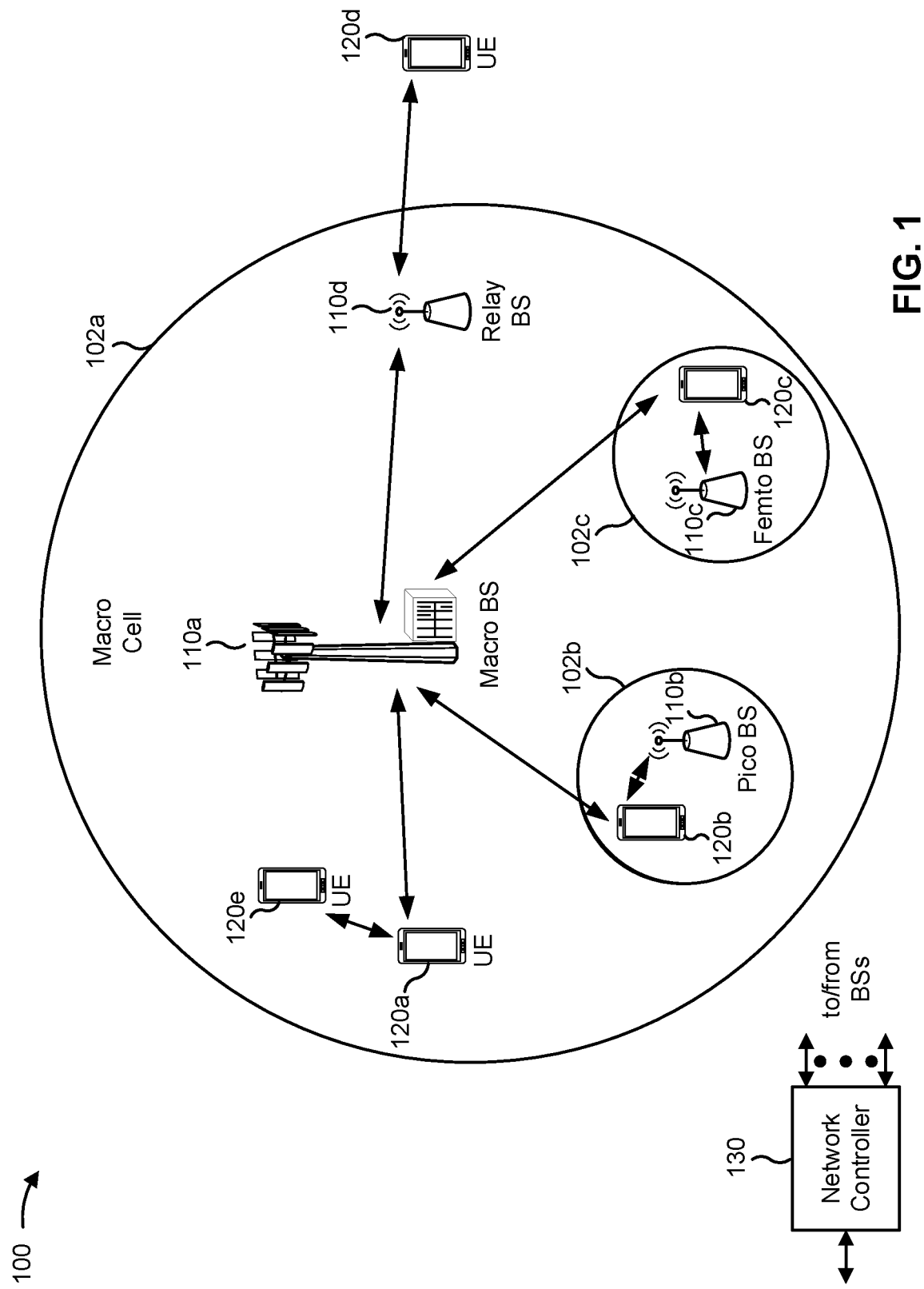
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110

(shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
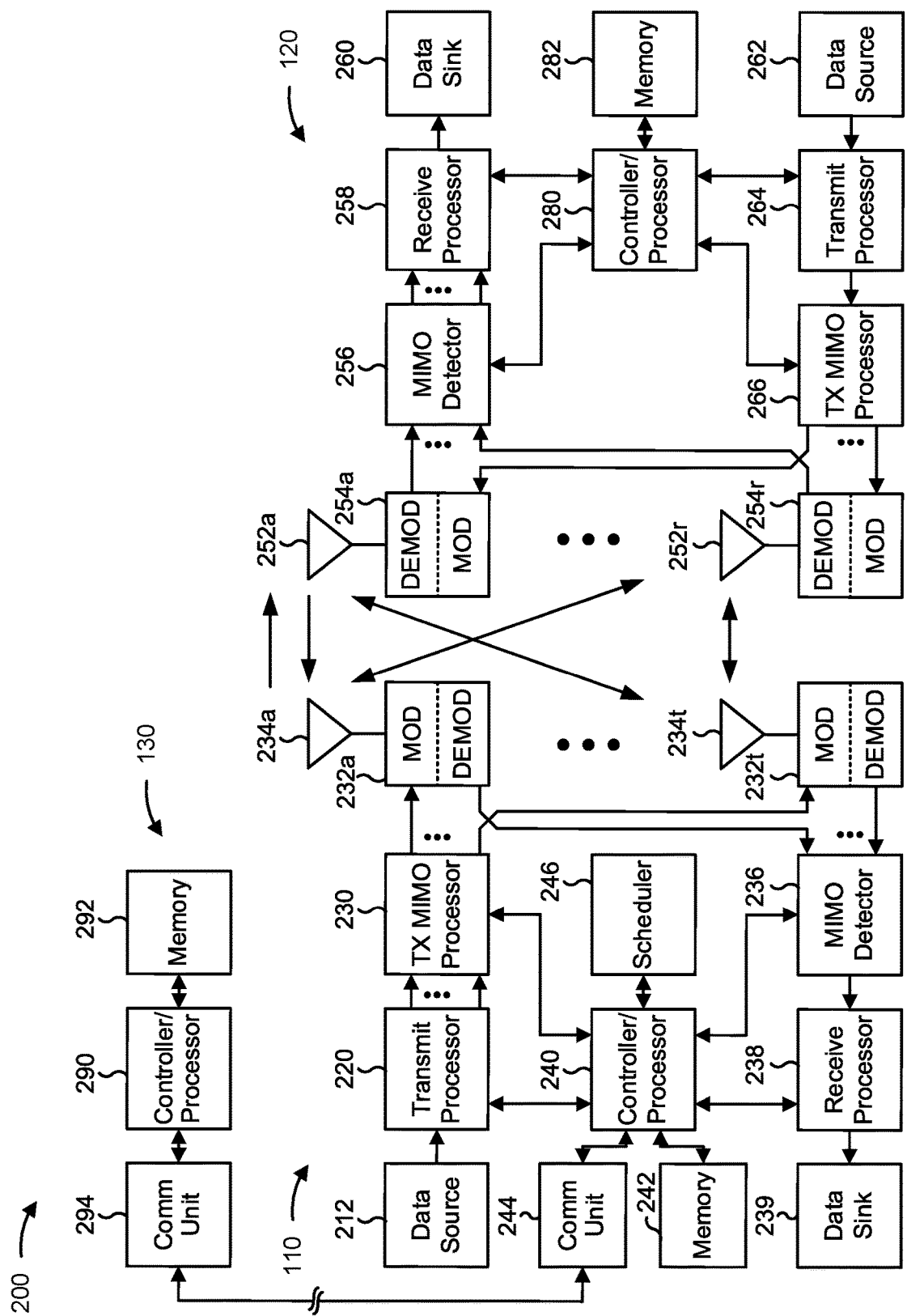
FIG. 2 is a block diagram conceptually illustrating an example of a base station (BS) in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with control resource set (CORESET) precoding indication, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 800 of FIG. 8, process 900 of FIG. 9, and/or other processes as described herein. A scheduler 246 may schedule UEs for data transmission on the downlink and/or uplink.

In some aspects, UE 120 may include means for receiving a configuration for a CORESET that indicates a precoder granularity unit over which a same precoding is used for resources of the CORESET, wherein the precoder granularity unit is greater than an REG bundle of the CORESET and less than contiguous resource blocks of the CORESET, means for monitoring for one or more PDCCH candidates according to the configuration, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining, for a CORESET, a precoder granularity unit over which a same precoding is used for resources of the CORESET, wherein the precoder granularity unit is greater than an REG bundle of the CORESET and less than contiguous resource blocks of the CORESET, means for transmitting, to a UE, a configuration that indicates the precoder granularity unit, to enable the UE to monitor for one or more PDCCH candidates according to the configuration, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

FIG. 3A illustrates an example resource structure 300 for wireless communication, in accordance with various aspects of the present disclosure. Resource structure 300 shows an example of various groups of resources described herein. As shown, resource structure 300 may include a subframe 305. Subframe 305 may include multiple slots 310. While resource structure 300 is shown as including 2 slots per subframe, a different number of slots may be included in a subframe (e.g., 4 slots, 8 slots, 16 slots, 32 slots, and/or the like). In some aspects, different types of transmission time intervals (TTIs) may be used, other than subframes and/or slots. A slot 310 may include multiple symbols 315, such as 7 symbols or 14 symbols per slot.

The potential control region of a slot 310 may be referred to as a CORESET 320, and may be structured to support an efficient use of resources, such as by flexible configuration or reconfiguration of resources of the CORESET 320 for one or more physical downlink control channels (PDCCHs), one or more physical downlink shared channels (PDSCHs), and/or the like. In some aspects, the CORESET 320 may occupy the first symbol 315 of a slot 310, the first two symbols 315 of a slot 310, or the first three symbols 315 of a slot 310. Thus, a CORESET 320 may include multiple resource blocks (RBs) in the frequency domain, and either one, two, or three symbols 315 in the time domain. In 5G, a quantity of resources included in the CORESET 320 may be flexibly configured, such as by using radio resource control (RRC) signaling to indicate a frequency domain region (e.g., a quantity of resource blocks) and/or a time domain region (e.g., a quantity of symbols) for the CORESET 320.

As illustrated, a symbol 315 that includes CORESET 320 may include one or more control channel elements (CCEs) 325, shown as two CCEs 325 as an example, that span a portion of the system bandwidth. A CCE 325 may include downlink control information (DCI) that is used to provide control information for wireless communication. A base station may transmit DCI during multiple CCEs 325 (as shown), where the quantity of CCEs 325 used for transmission of DCI represents the aggregation level (AL) used by the BS for the transmission of DCI. In FIG. 3A, an aggregation level of two is shown as an example, corresponding to two CCEs 325 in a slot 310. In some aspects, different aggregation levels may be used, such as 1, 4, 8, 16, and/or the like.

Each CCE 325 may include a fixed quantity of resource element groups (REGs) 330, shown as 4 REGs 330, or may include a variable quantity of REGs 330. In some aspects, the quantity of REGs 330 included in a CCE 325 may be specified by an REG bundle size. An REG 330 may include one resource block, which may include 12 resource elements (REs) 335 within a symbol 315. A resource element 335 may occupy one subcarrier in the frequency domain and one OFDM symbol in the time domain.

A CORESET 320 may include one or more search spaces, such as a UE-specific search space, a group-common search space, and/or a common search space. A search space may indicate a set of CCE locations where a UE may find PDCCHs that can potentially be used to transmit control information to the UE. The possible locations for a PDCCH may depend on whether the PDCCH is a UE-specific PDCCH (e.g., for a single UE) or a group-common PDCCH (e.g., for multiple UEs), an aggregation level being used, and/or the like. A possible location (e.g., in time and/or frequency) for a PDCCH may be referred to as a PDCCH candidate, and the set of all possible PDCCH locations may be referred to as a search space. For example, the set of all possible PDCCH locations for a particular UE may be referred to as a UE-specific search space. Similarly, the set of all possible PDCCH locations across all UEs may be referred to as a common search space. Similarly, the set of all possible PDCCH locations for a particular group of UEs may be referred to as a group-common search space.

A UE may perform channel estimation for one or more PDCCH candidates or CCEs 325 of the CORESET 320. In some cases, the UE may aggregate, for channel estimation, frequency domain resources that use the same spatial precoding, thereby reducing a complexity of the channel estimation. The UE may be configured with a precoder granularity that identifies frequency domain resources over which the same precoding is used.

For example, the precoder granularity may indicate that REGs 330 of contiguous resource blocks of the CORESET 320 use the same precoding. However, such a precoder granularity may be too broad and limit BS performance because the CORESET 320 cannot be used to schedule multiple UEs that lack spatial alignment. As another example, the precoder granularity may indicate that REGs 330 of an REG bundle use the same precoding. However, such a precoder granularity may be too narrow and limit channel estimation performance of a UE by limiting frequency domain resources that can be aggregated for channel estimation. Moreover, this precoder granularity may be unsuitable for UEs with reduced capability.

In particular, different types of UEs may operate in a cell provided by a BS. For example, a BS may provide network service to a premium UE (which may be termed a legacy UE or a high-tier UE), an NR-Light (or NR-Lite) UE (which may be termed a low-tier UE), and/or the like. A premium UE may be a UE that is associated with a receive bandwidth capability in receiving downlink signals/channels that is above a particular threshold (for example, a bandwidth of greater than or equal to 100 megahertz (MHz)). In contrast, an NR-Light UE may be a UE with a bandwidth capability in receiving the downlink signals/channels that is below a particular threshold (for example, a bandwidth of less than 10 MHz, less than 5 MHz, or the like). Moreover, an NR-Light UE may have a lesser quantity of receive antennas or a lower computational or memory capacity than a premium UE. Accordingly, NR-Light UEs that have reduced capability (e.g., a lesser quantity of receive antennas) may experience reduced PDCCH coverage when an REG bundle is the unit of precoder granularity.

Some techniques and apparatuses described herein provide additional precoder granularities that may be used to improve frequency domain resource aggregation for channel estimation. In some aspects, a precoder granularity unit, over which the same precoding is used, may be greater than an REG bundle of a CORESET and less than contiguous resource blocks of the CORESET. For example, the precoder granularity unit may be a PDCCH candidate. In this way, channel estimation performance of UEs, such as NR-Light UEs, may be improved, while permitting a BS to schedule multiple UEs that are not spatially aligned in the same CORESET.

As indicated above, FIG. 3A is provided as an example. Other examples may differ from what is described with regard to FIG. 3A.

Figure 3B:
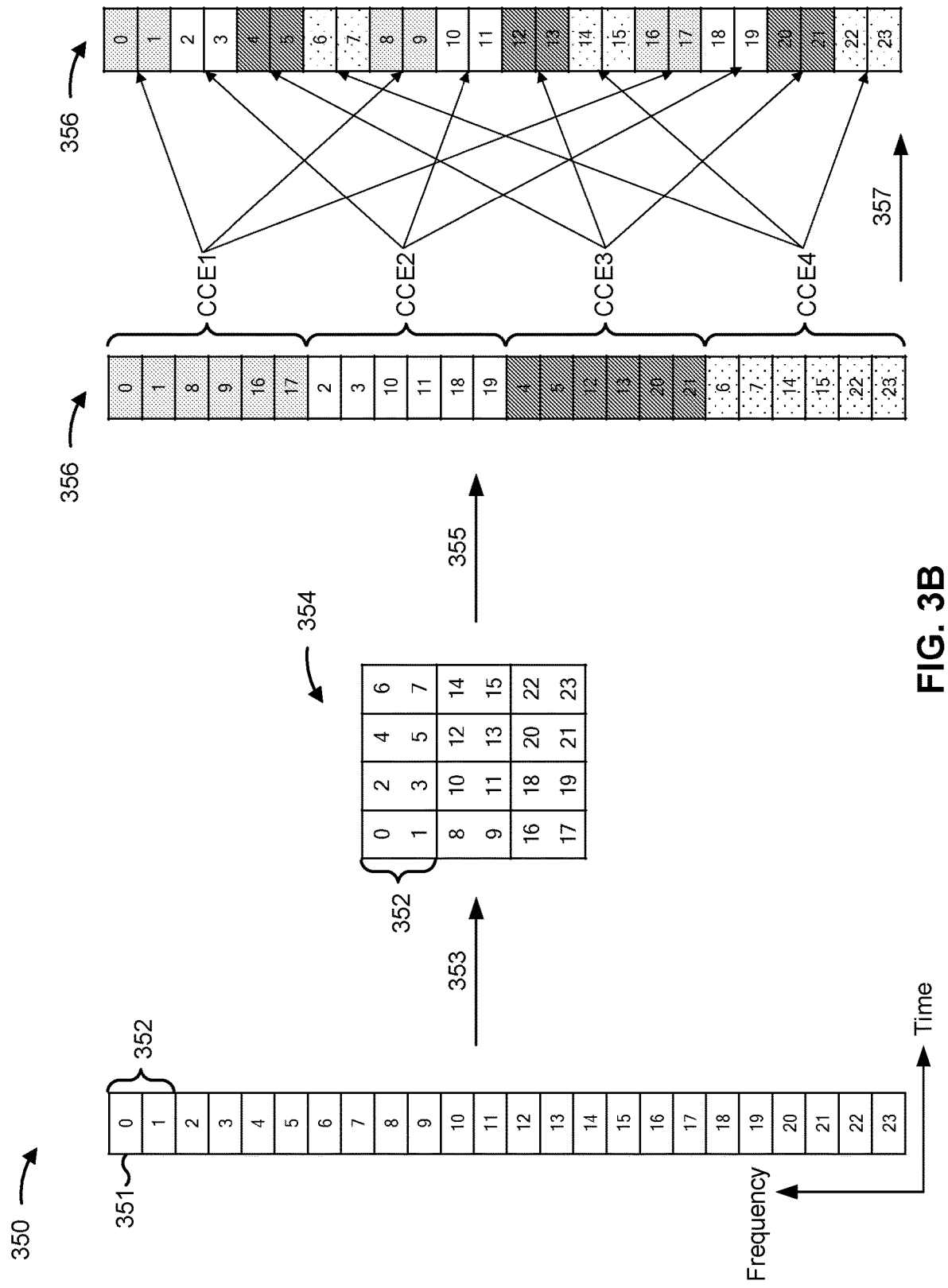
FIGS. 3B-3D are diagrams illustrating examples of interleaving of a control resource set (CORESET), in accordance with various aspects of the present disclosure.

FIG. 3B is a diagram illustrating an example 350 of interleaving of a CORESET, in accordance with various aspects of the present disclosure. In particular, example 350 may illustrate an example of interleaving a CORESET that is in three or fewer symbols (e.g., one symbol, two symbols, or three symbols). As shown in FIG. 3B, an REG bundle 352 may be configured to include two REGs 351 (i.e., the REG bundle 352 may be configured to have a size of two REGs 351). That is, the REG bundle 352 may have an REG bundle shape that includes two REGs 351 in a frequency domain and one symbol in a time domain (e.g., for a CORESET 356 in one symbol).

As shown by reference number 353, the REG bundles 352 may be written into a matrix 354 according to an interleaving configuration. For example, the interleaving configuration may indicate a quantity of rows that are to be used for interleaving. As shown, the quantity of rows may be three (e.g., the matrix 354 may include three rows). The REG bundles 352 may be written into the matrix 354 by row, such that the REG bundles 352 are written to a first row of the matrix 354 first, a second row of the matrix 354 second, and so forth.

As shown by reference number 355, the REG bundles 352 may be read out of the matrix 354, in REG bundle units, and mapped to a plurality of CCEs (CCE1, CCE2, CCE3, and CCE4) of a CORESET 356. For example, the REG bundles 352 may be read out of the matrix 354, by column, and mapped to the plurality of CCEs. As an example, REG bundles 352 in a first column of the matrix 354 are mapped to the plurality of CCEs first, REG bundles 352 in a second column are mapped to the plurality of CCEs second, and so forth. A CCE may include six REGs 351 (i.e., three REG bundles 352 of two REGs 351).

As shown by reference number 357, the mapping of the REG bundles 352 to the plurality of CCEs of the CORESET 356 may result in an interleaving of the REG bundles 352 in the plurality of CCEs of the CORESET 356.

As indicated above, FIG. 3B is provided as an example. Other examples may differ from what is described with respect to FIG. 3B.

Figure 3C:
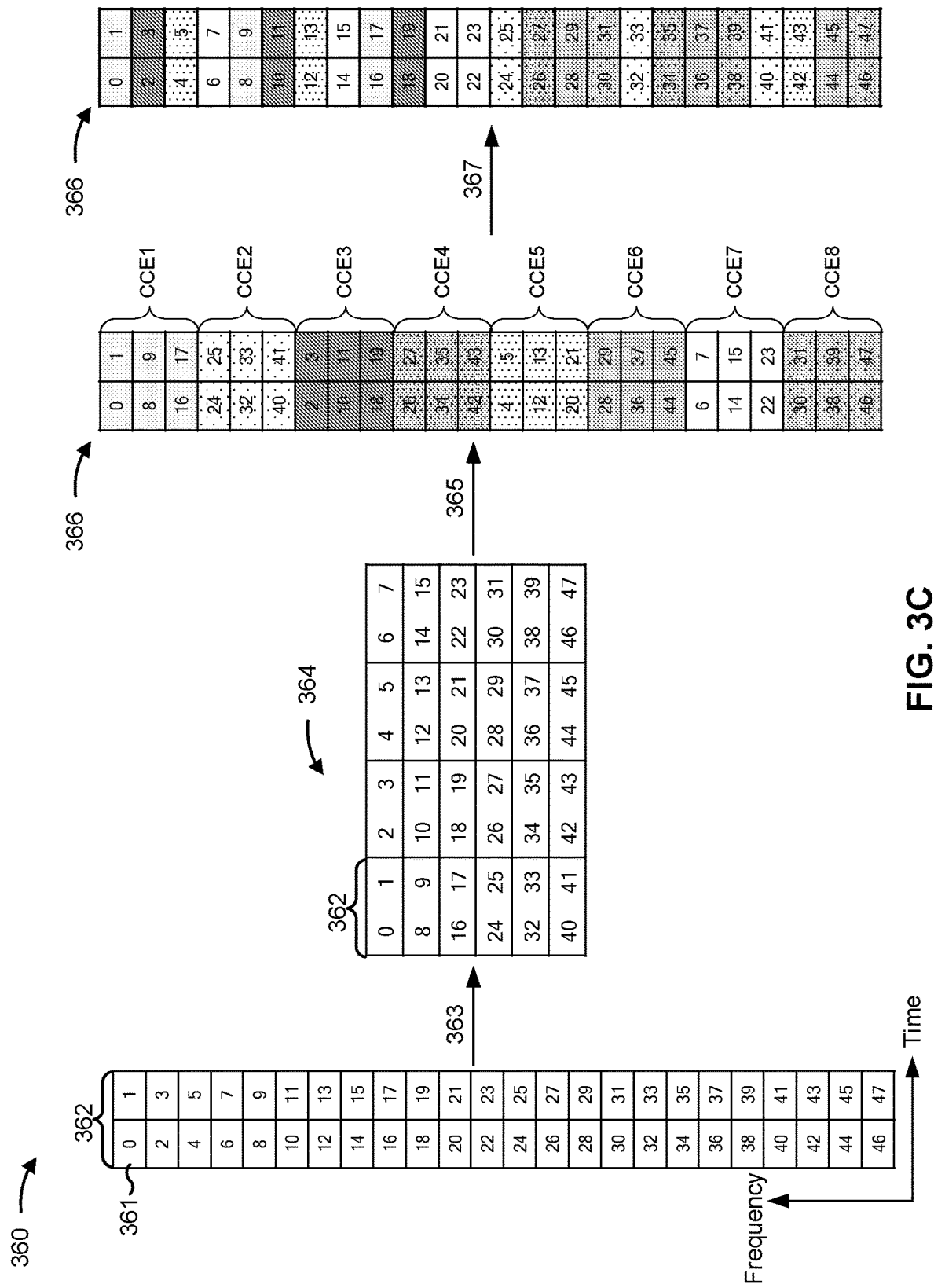

FIG. 3C is a diagram illustrating an example 360 of interleaving of a CORESET, in accordance with various aspects of the present disclosure. In particular, example 360 may illustrate an example of interleaving a CORESET that is in three or fewer symbols. As shown in FIG. 3C, an REG bundle 362 may be configured to include two REGs 361. That is, the REG bundle 362 may have an REG bundle shape that includes two REGs 361 in two symbols in the time domain (e.g., for a CORESET 366 in two symbols).

As shown by reference number 363, the REG bundles 362 may be written into a matrix 364 according to an interleaving configuration, as described above in connection with FIG. 3B. For example, the interleaving configuration may indicate a quantity of rows that are to be used for interleaving. As shown, the quantity of rows may be six (e.g., the matrix 364 may include six rows).

As shown by reference number 365, the REG bundles 362 may be read out of the matrix 364, in REG bundle units, and mapped to a plurality of CCEs (CCE1-CCE8) of a CORESET 366, as described above in connection with FIG. 3B.

As shown by reference number 367, the mapping of the REG bundles 362 to the plurality of CCEs of the CORESET 366 may result in an interleaving of the REG bundles 362 in the plurality of CCEs of the CORESET 366.

As indicated above, FIG. 3C is provided as an example. Other examples may differ from what is described with respect to FIG. 3C.

Figure 3D:
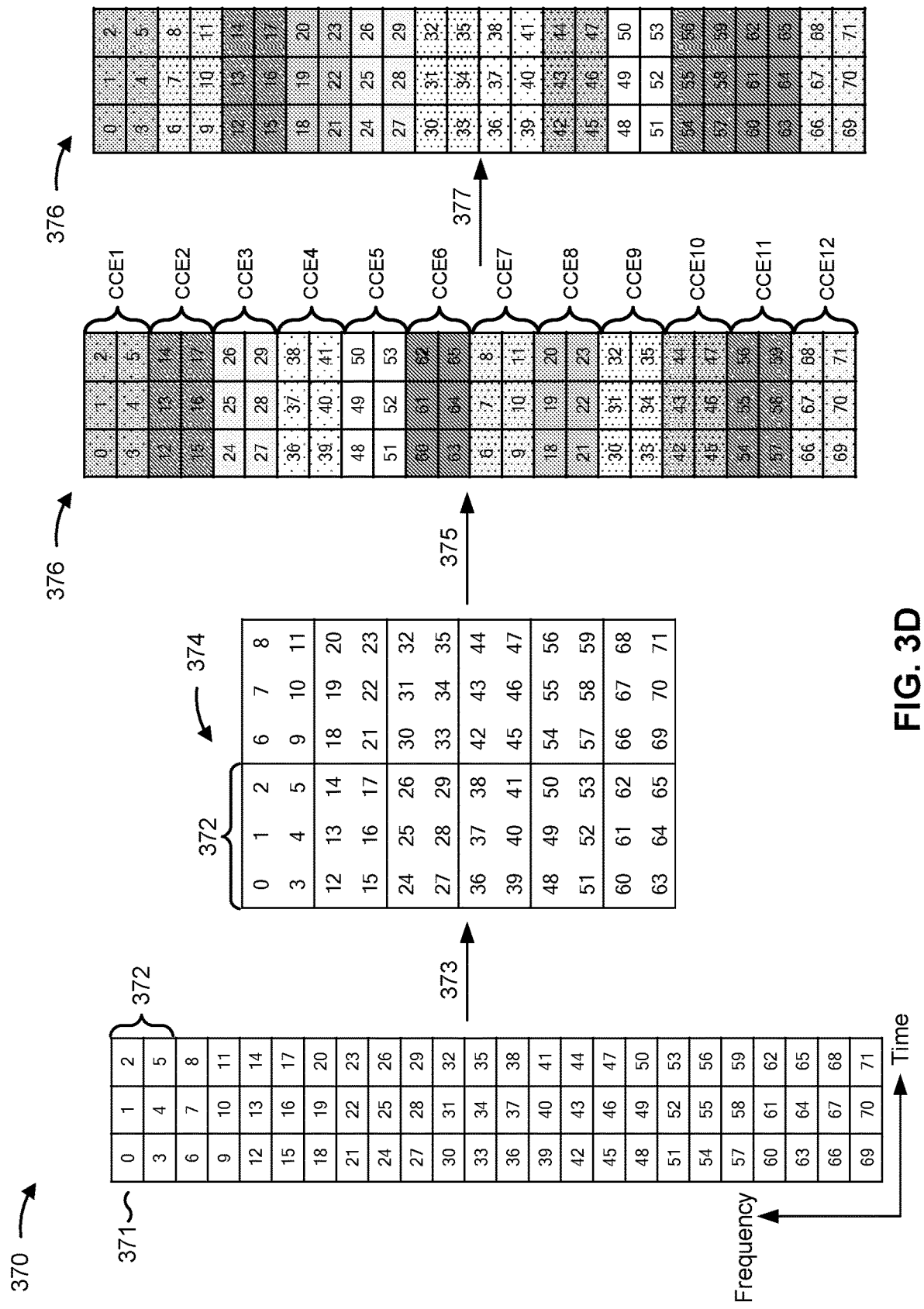

FIG. 3D is a diagram illustrating an example 370 of interleaving of a CORESET, in accordance with various aspects of the present disclosure. In particular, example 370 may illustrate an example of interleaving a CORESET that is in three or fewer symbols. As shown in FIG. 3D, an REG bundle 372 may be configured to include six REGs 371. That is, the REG bundle 372 may have an REG bundle shape that includes two REGs 371 in the frequency domain in three symbols in the time domain (e.g., for a CORESET 376 in three symbols).

As shown by reference number 373, the REG bundles 372 may be written into a matrix 374 according to an interleaving configuration, as described above in connection with FIG. 3B. For example, the interleaving configuration may indicate a quantity of rows that are to be used for interleaving. As shown, the quantity of rows may be six (e.g., the matrix 374 may include six rows).

As shown by reference number 375, the REG bundles 372 may be read out of the matrix 374, in REG bundle units, and mapped to a plurality of CCEs (CCE1-CCE12) of a CORESET 376, as described above in connection with FIG. 3B.

As shown by reference number 377, the mapping of the REG bundles 372 to the plurality of CCEs of the CORESET 376 may result in an interleaving of the REG bundles 372 in the plurality of CCEs of the CORESET 376.

As indicated above, FIG. 3D is provided as an example. Other examples may differ from what is described with respect to FIG. 3D.

Figure 4:
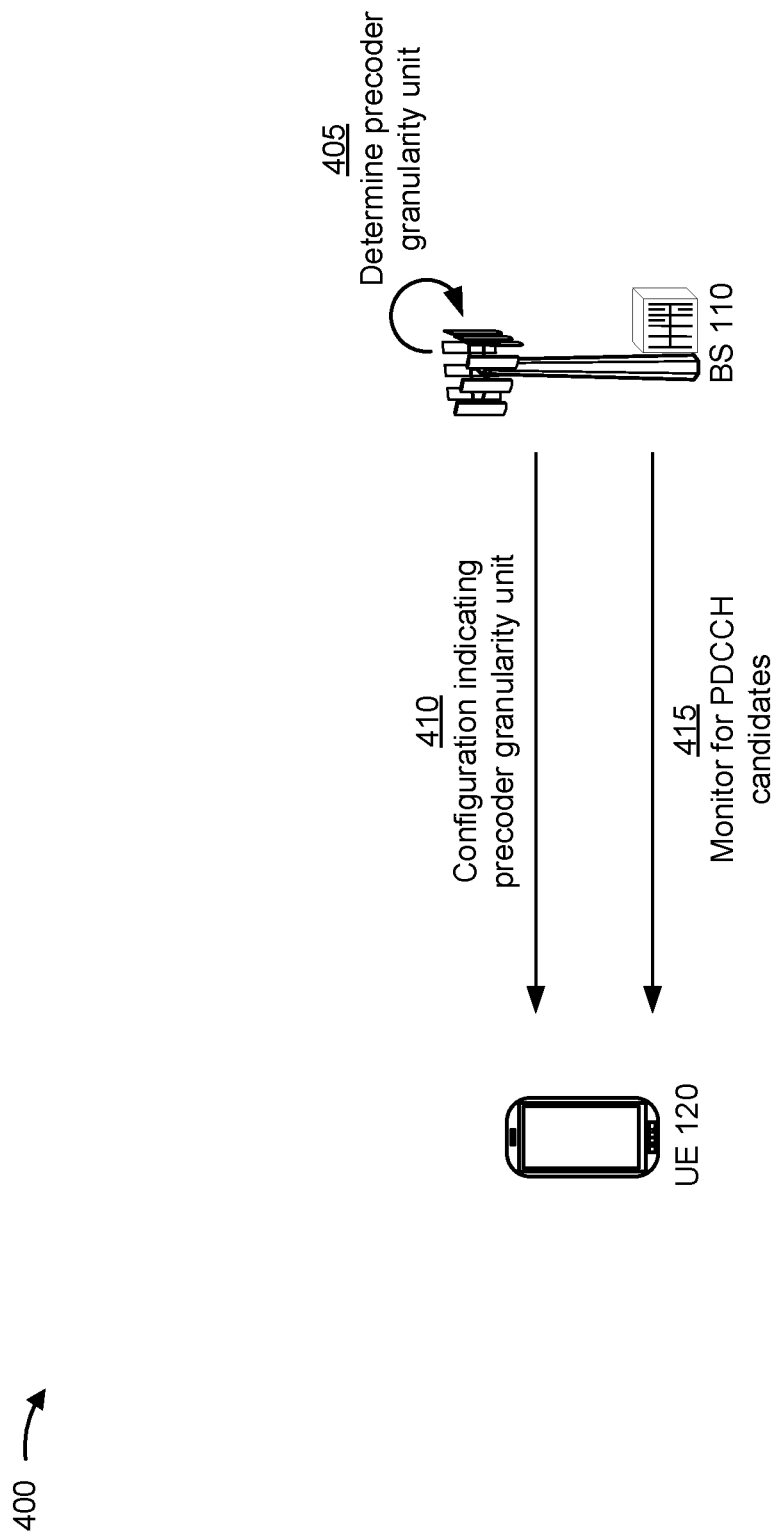
FIGS. 4-7 are diagrams illustrating examples of CORESET precoding indication, in accordance with various aspects of the present disclosure.

FIG. 4 is a diagram illustrating an example 400 of CORESET precoding indication, in accordance with various aspects of the present disclosure. As shown in FIG. 4, a BS 110 may communicate with a UE 120 in connection with a PDCCH communication. In some aspects, the UE 120 may be an NR-Light UE, such as a wearable device, an Internet of Things (IoT) device, a sensor, a camera, and/or the like, that is associated with a limited bandwidth, power capacity, transmission range, and/or the like. For example, the UE 120 may have a quantity of receive antennas that satisfies (e.g., is below) a threshold value and/or a bandwidth capability that satisfies (e.g., is below) a threshold value.

As shown in FIG. 4, and by reference number 405, the BS 110 may determine a precoder granularity unit that the UE 120 is to use to monitor for PDCCH candidates associated with a CORESET. The precoder granularity unit may indicate resources (e.g., frequency domain resources) of the CORESET over which the same precoding is used.

In some aspects, the precoder granularity unit may be an REG bundle of the CORESET (e.g., an REG bundle of a size that is configured for the CORESET). In this case, REGs of an REG bundle may use the same precoding. In some aspects, the precoder granularity unit may be contiguous resource blocks of the CORESET. In this case, REGs of contiguous resource blocks of the CORESET may use the same precoding.

In some aspects, the precoder granularity unit may be greater than an REG bundle of the CORESET and less than contiguous resource blocks of the CORESET. For example, the precoder granularity unit may be a PDCCH candidate associated with a particular aggregation level (as described in connection with FIG. 5), a PDCCH candidate associated with a lowest aggregation level, of one or more aggregation levels that are configured for a search space set of the CORESET, having a non-zero quantity of PDCCH candidates (as described in connection with FIG. 6), resource block groups that are contiguously identified for the CORESET (as described in connection with FIG. 7), and/or the like.

As shown by reference number 410, the BS 110 may transmit, and the UE 120 may receive, a configuration that indicates the precoder granularity unit that is determined. For example, the configuration may be a PDCCH configuration, a CORESET configuration, and/or the like. The BS 110 may transmit the configuration by RRC signaling. In some aspects, the precoder granularity unit may be indicated in a field of the configuration, such as a precoderGranularity field.

As shown by reference number 415, the UE 120 may monitor for one or more PDCCH candidates according to the configuration. For example, the UE 120 may perform channel estimation, when monitoring for the one or more PDCCH candidates, according to the configuration. In this case, the UE 120 may aggregate REG bundles according to the precoder granularity unit that is indicated by the configuration, and may determine that each set of aggregated REG bundles uses a respective precoding. For example, the UE 120 may determine that one or more aggregated REG bundles of a first set use a first precoding and one or more aggregated REG bundles of a second set use a second precoding. Accordingly, the UE 120 may perform channel estimation for a set of aggregated REG bundles, thereby improving channel estimation efficiency.

As indicated above, FIG. 4 is provided as an example. Other examples may differ from what is described with respect to FIG. 4.

Figure 5:
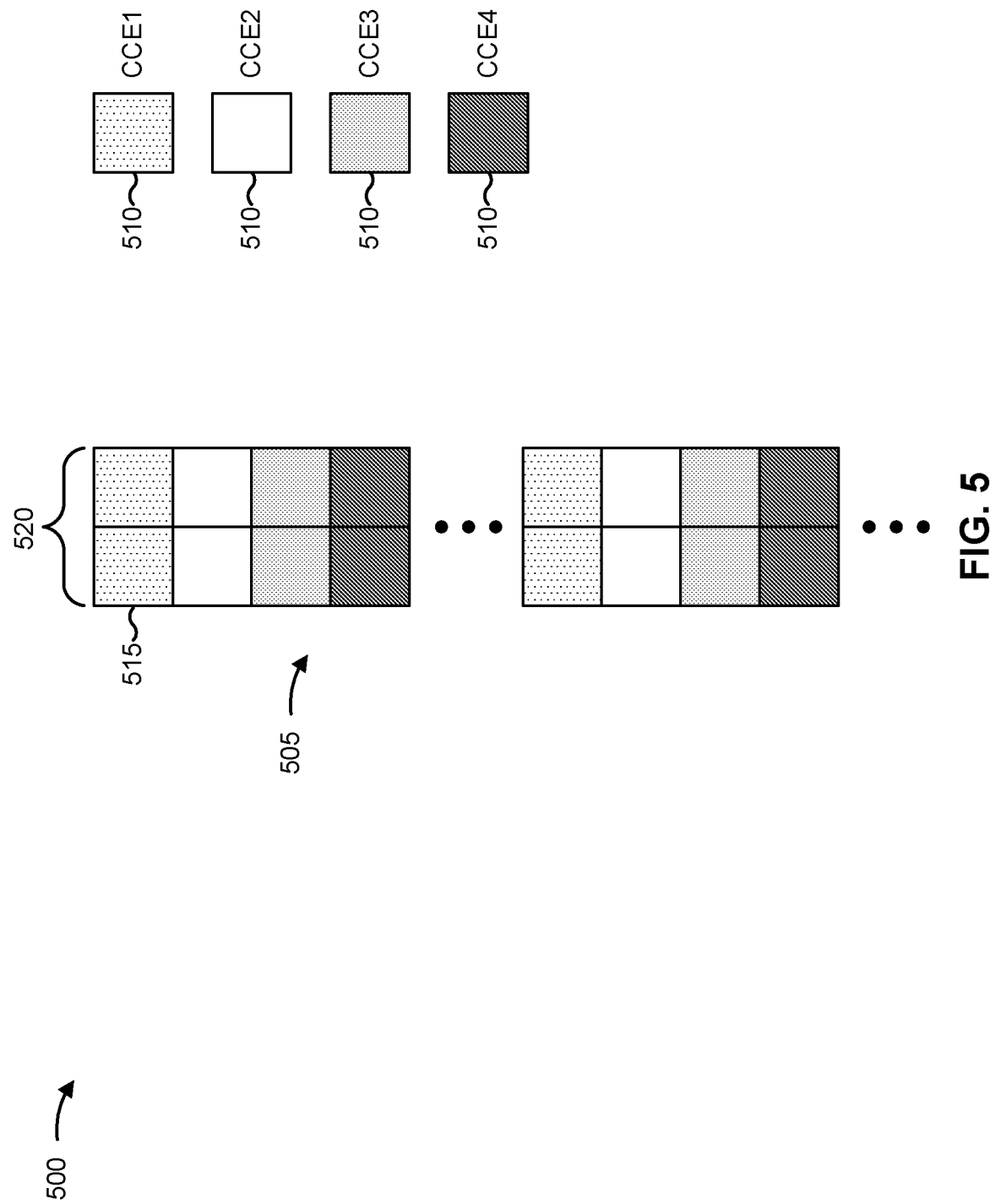

FIG. 5 is a diagram illustrating an example 500 of CORESET precoding indication, in accordance with various aspects of the present disclosure. FIG. 5 shows a plurality of CCEs 510 (CCE1, CCE2, CCE3, and CCE4) that are mapped to a CORESET 505 in an interleaved manner (e.g., according to an interleaving described in connection with FIGS. 3B-3D). The CCEs 510 are interleaved for illustration of example 500, and in some aspects, the CCEs 510 may not be interleaved.

A PDCCH candidate may include one or more (e.g., 1, 2, 4, 8, 16, or the like) CCEs 510 according to an aggregation level that is configured for a search space set associated with the CORESET 505. A CCE 510 may include a quantity (e.g., 6) of REGs 515, and multiple (e.g., 2, 3, 6, or the like) REGs 515 may be aggregated in an REG bundle 520 (shown as 2 REGs 515 in an REG bundle 520).

In some aspects, the precoder granularity unit, described in connection with FIG. 4, may be a PDCCH candidate associated with a particular aggregation level (which may be designated as PerPDCCH-AnyAL in the precoderGranularity field of the configuration described in connection with FIG. 4). In other words, a search space of the CORESET 505 may include PDCCH candidates of various aggregation levels, and the precoder granularity unit may indicate that REG bundles 520 associated with a particular PDCCH candidate, regardless of an aggregation level of the particular PDCCH candidate, are to use the same precoding.

For example, if an aggregation level is one (1) for several PDCCH candidates (i.e., a PDCCH candidate includes one CCE), then REG bundles 520 of CCE1 may use a first precoding, REG bundles 520 of CCE2 may use a second precoding, and so forth. As another example, if an aggregation level for several PDCCH candidates is two (2) (i.e., a PDCCH candidate includes two CCEs), then REG bundles 520 of CCE1 and CCE2 may use a first precoding, REG bundles 520 of CCE3 and CCE4 may use a second precoding, and so forth.

In other words, REG bundles 520 of a first PDCCH candidate associated with a particular aggregation level (e.g., 4 CCEs 510) may use a first precoding and REG bundles 520 of a second PDCCH candidate associated with the same particular aggregation level (e.g., 4 CCEs 510) may use a second precoding. In addition, REG bundles 520 of a first PDCCH candidate associated with a first aggregation level (e.g., 4 CCEs 510) may use a first precoding and REG bundles 520 of a second PDCCH candidate associated with a second aggregation level (e.g., 8 CCEs 510) may use a second precoding. In this way, the UE 120 may perform a single channel estimation for REG bundles 520 that use the same precoding. This may be useful when the CORESET 505 includes a Type0 search space or a random access search space.

In some aspects, a single REG bundle 520 may be associated with multiple PDCCH candidates of different aggregation levels. For example, the single REG bundle 520 may be associated with a first PDCCH candidate associated with a first aggregation level (e.g., 4 CCEs 510) and a second PDCCH candidate associated with a second aggregation level (e.g., 8 CCEs 510). In this case, the single REG bundle 520 may use a first precoding with respect to the first PDCCH candidate and a second precoding with respect to the second PDCCH candidate. Thus, the UE 120 may perform multiple channel estimations for the single REG bundle 520 with respect to the multiple PDCCH candidates.

In some aspects, REG bundles 520 associated with a PDCCH candidate may use the same precoding based at least in part on a frequency adjacency or separation of the REG bundles 520. For example, REG bundles 520 may use the same precoding when the REG bundles 520 are adjacent in the frequency domain. As another example, REG bundles 520 may use the same precoding when the REG bundles 520 have frequency separations that satisfy a threshold value (e.g., a threshold value that is RRC configured for the UE 120). Accordingly, a first REG bundle 520 of a PDCCH candidate may use a first precoding, and a second REG bundle 520 of the PDCCH candidate may use a second precoding, when the first REG bundle 520 and the second REG bundle are not adjacent in the frequency domain and/or have a frequency separation that does not satisfy the threshold value.

In some aspects, the UE 120 may determine that the frequency adjacency or separation of REG bundles 520 is to be used to determine a precoding used by the REG bundles 520 when the REG bundles 520 are configured with a cyclic shift. That is, the frequency adjacency or separation criteria for determining precoding of REG bundles 520, as described above, may be activated when the REG bundles 520 are configured with a cyclic shift. The configuration (described in connection with FIG. 4) may set a ShiftIndex field to a non-zero value to indicate that the REG bundles 520 are to be cyclic shifted.

As indicated above, FIG. 5 is provided as an example. Other examples may differ from what is described with respect to FIG. 5.

Figure 6:
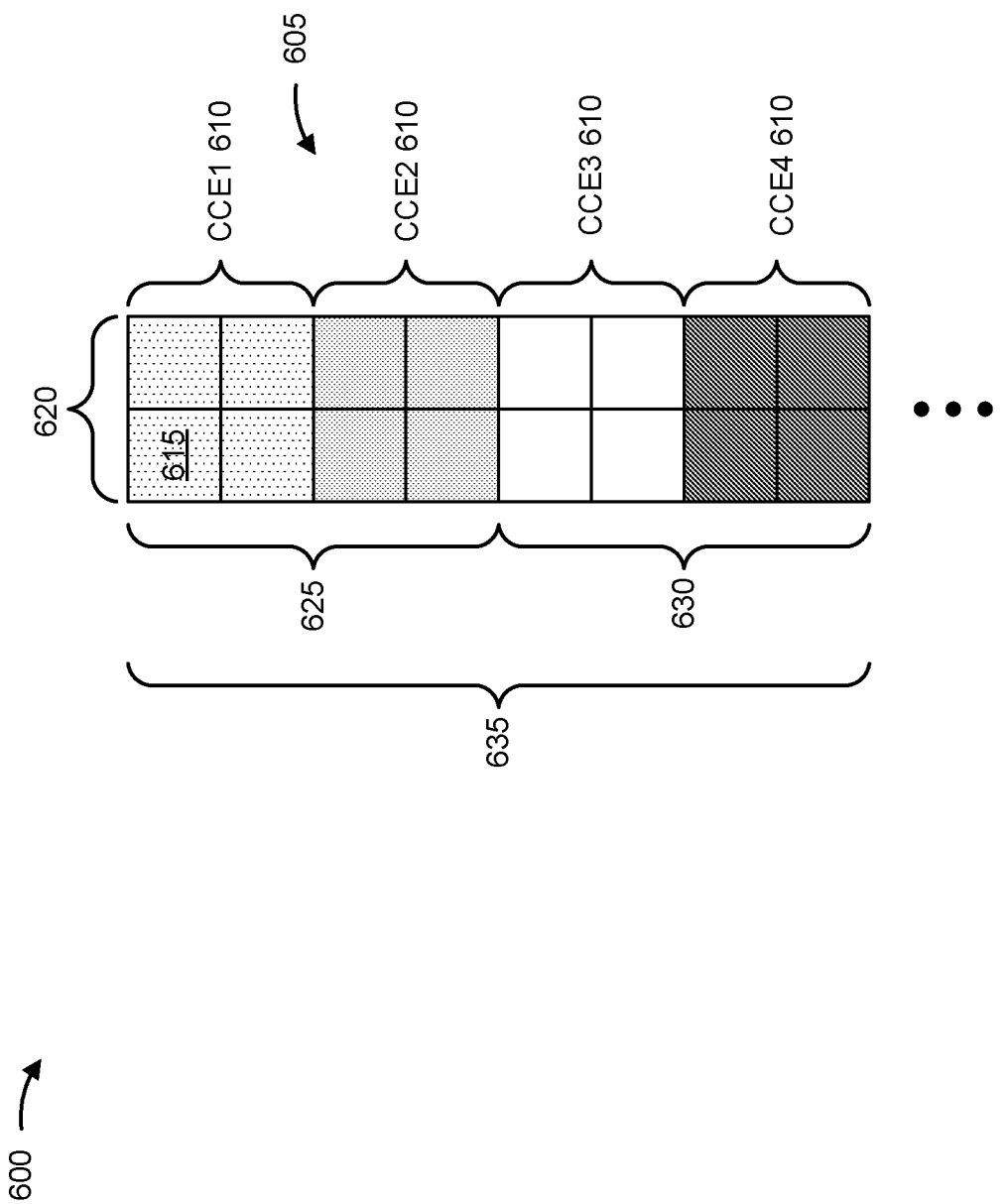

FIG. 6 is a diagram illustrating an example 600 of CORESET precoding indication, in accordance with various aspects of the present disclosure. FIG. 6 shows a plurality of CCEs 610 (CCE1, CCE2, CCE3, and CCE4) that are mapped to a CORESET 605 in a non-interleaved manner. The CCEs 610 are non-interleaved for illustration of example 600, and in some aspects, the CCEs 610 may be interleaved (e.g., according to an interleaving described in connection with FIGS. 3B-3D).

A PDCCH candidate may include one or more CCEs 610 according to an aggregation level that is configured for a search space set associated with the CORESET 605, as described above. A CCE 610 may include a quantity of REGs 615, and multiple REGs 615 may be aggregated in an REG bundle 620, as described above. As shown in FIG. 6, a PDCCH candidate 625 may have an aggregation level of 2 (including CCE1 and CCE2), a PDCCH candidate 630 may have an aggregation level of 2 (including CCE3 and CCE4), and a PDCCH candidate 635 may have an aggregation level of 4 (including CCE1, CCE2, CCE3, and CCE4).

In some aspects, the precoder granularity unit, described in connection with FIG. 4, may be a PDCCH candidate associated with a lowest aggregation level having a non-zero quantity of PDCCH candidates (which may be designated as PerPDCCH-LowestAL in the precoderGranularity field of the configuration described in connection with FIG. 4). A lowest aggregation level having a non-zero quantity of PDCCH candidates may be referred to herein as a lowest utilized aggregation level. A lowest utilized aggregation level may be one of one or more aggregation levels that are configured for a search space set of the CORESET 605. For example, a configuration received by the UE 120 (e.g., a search space configuration) may indicate respective quantities of PDCCH candidates that are configured for multiple aggregation levels (e.g., for aggregation levels of 1, 2, 4, 8, and 16) of a search space set, and the precoder granularity unit may be a lowest aggregation level for which the indicated quantity of PDCCH candidates is a non-zero value. Accordingly, in some cases, there may be one or more aggregation levels, having zero PDCCH candidates, that are lower than the lowest utilized aggregation level.

As an example in which a lowest utilized aggregation level is two, REG bundles 620 associated with PDCCH candidate 625 (i.e., the REG bundles 620 of CCE1 and CCE2) may use a first precoding and REG bundles 620 associated with PDCCH candidate 630 (i.e., the REG bundles 620 of CCE3 and CCE4) may use a second precoding. In other words, REG bundles 620 of a first PDCCH candidate associated with the lowest utilized aggregation level may use a first precoding and REG bundles 620 of a second PDCCH candidate associated with the lowest utilized aggregation level may use a second precoding. In this way, the UE 120 may perform a single channel estimation for REG bundles 620 that use the same precoding.

However, REG bundles 620 of a PDCCH candidate associated with a higher aggregation level than the lowest utilized aggregation level may not use the same precoding. As an example in which a lowest utilized aggregation level is two, REG bundles 620 of the PDCCH candidate 635 (associated with an aggregation level of four) may not use the same precoding. In particular, REG bundles 620 of the PDCCH candidate 635 may use a first precoding associated with the PDCCH candidate 625 (which is associated with the lowest utilized aggregation level) and a second precoding associated with the PDCCH candidate 630 (which is associated with the lowest utilized aggregation level). In such cases, the UE 120 may determine that channel estimation for REG bundles 620 of a PDCCH candidate associated with a higher aggregation level than the lowest utilized aggregation level is not to be performed (e.g., because channel estimation for the REG bundles 620 is performed in connection with the PDCCH candidates associated with the lowest aggregation level).

In some aspects, the UE 120 may not be configured to monitor all PDCCH candidates of a lowest utilized aggregation level. For example, the UE 120 may be configured to monitor the PDCCH candidate 625 and may not be configured to monitor the PDCCH candidate 630. Furthermore, if the UE 120 is configured to monitor a PDCCH candidate of a higher aggregation level (e.g., PDCCH candidate 635) that shares REG bundles 620 with an unmonitored PDCCH candidate of the lowest aggregation level (e.g., PDCCH candidate 630), the UE 120 may perform channel estimation for the REG bundles 620 of the unmonitored PDCCH candidate (e.g., PDCCH candidate 630). In this case, the UE 120 may determine a maximum quantity of PDCCH candidates that may be configured at the lowest utilized aggregation level in order to identify unmonitored PDCCH candidates that may be used for channel estimation of a monitored PDCCH candidate of a higher aggregation level.

In some aspects, REG bundles 620 associated with a PDCCH candidate may use the same precoding based at least in part on a frequency adjacency or separation of the REG bundles 620, as described in connection with FIG. 5.

As indicated above, FIG. 6 is provided as an example. Other examples may differ from what is described with respect to FIG. 6.

Figure 7:
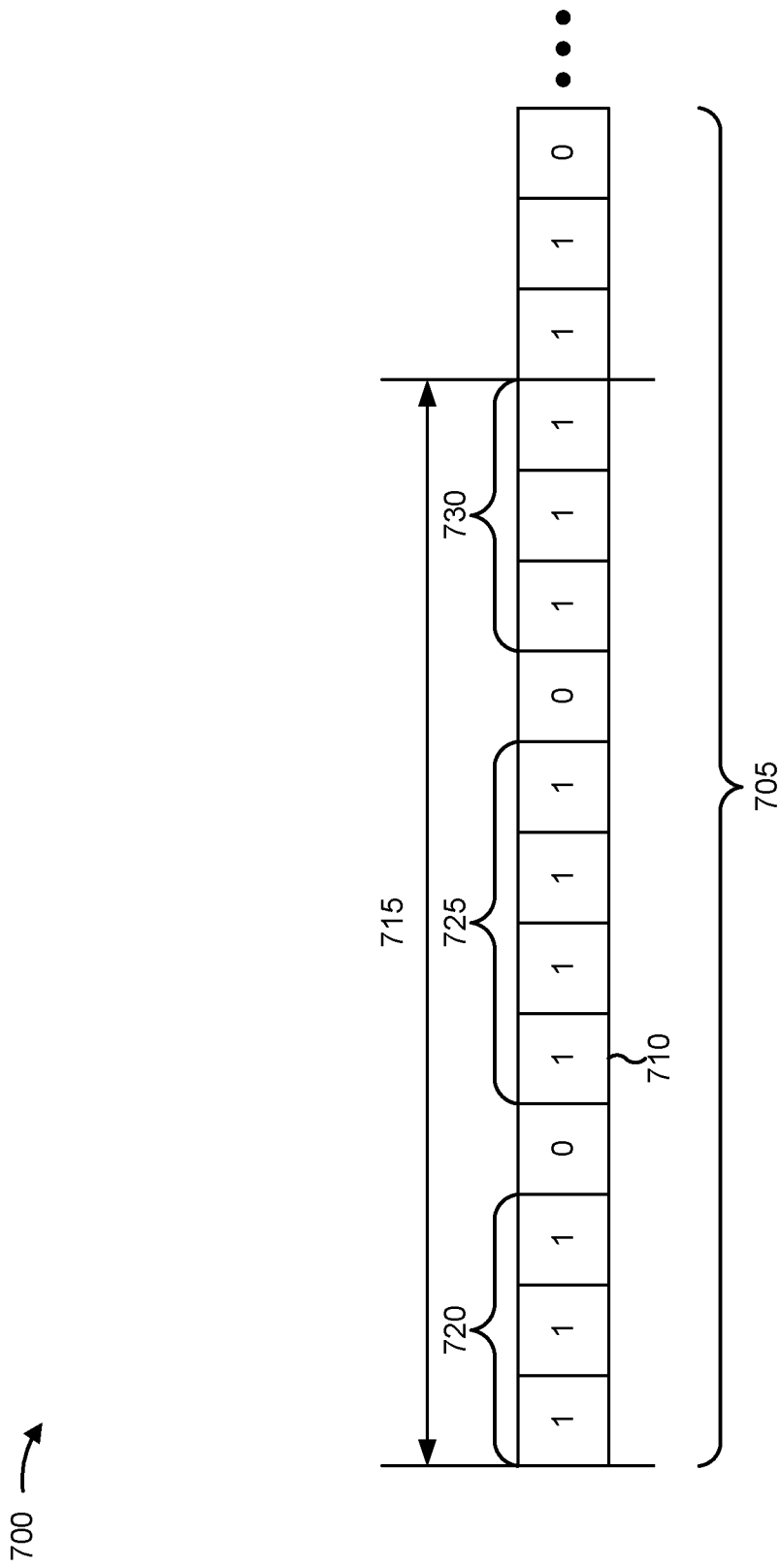

FIG. 7 is a diagram illustrating an example 700 of CORESET precoding indication, in accordance with various aspects of the present disclosure. FIG. 7 shows a frequency domain resources bitmap 705 for a CORESET (which may be indicated in a frequencyDomainResources field of the configuration described in connection with FIG. 4). The bitmap 705 may include a plurality of bits 710. A bit 710 may identify a resource block group that includes a quantity (e.g., 6) of physical resource blocks. A set bit 710 of the bitmap 705 (e.g., set to a value of 1) may indicate that a resource block group associated with the set bit 710 is used by the CORESET.

One or more of the resource block groups mapped by the bitmap 705 may be associated with a particular bandwidth part (BWP). For example, one or more first resource block groups mapped by the bitmap 705 may be associated with a BWP 715 and one or more second resource block groups mapped by the bitmap 705 may be associated with another BWP.

In some aspects, the precoder granularity unit, described in connection with FIG. 4, may be resource block groups that are contiguously identified for the CORESET (which may be designated as ContiguousRBGroups in the precoderGranularity field of the configuration described in connection with FIG. 4). Resource block groups may be contiguously identified for the CORESET when consecutive bits 710 of the bitmap 705 are set (e.g., have a value of 1). For example, a first set 720 of resource block groups that are contiguously identified for the CORESET may use a first precoding, a second set 725 of resource block groups that are contiguously identified for the CORESET may use a second precoding, and a third set 730 of resource block groups that are contiguously identified for the CORESET may use a third precoding.

As shown in FIG. 7, the third set 730 of resource block groups may not include contiguously-identified resource block groups that are not associated with the BWP 715. In other words, the precoder granularity unit may be resource block groups, within a particular BWP, that are contiguously identified for the CORESET.

In some aspects, REG bundles of a PDCCH candidate, that are associated with resource block groups that are contiguously identified for the CORESET, may use the same precoding. For example, REG bundles of the PDCCH candidate that are associated with the first set 720 of resource block groups that are contiguously identified for the CORESET may use a first precoding, REG bundles of the PDCCH candidate that are associated with the second set 725 of resource block groups that are contiguously identified for the CORESET may use a second precoding, and so forth.

In some aspects, resource block groups that are contiguously identified for the CORESET may use the same precoding based at least in part on a frequency adjacency or separation of the resource block groups, as described in connection with FIG. 5.

As indicated above, FIG. 7 is provided as an example. Other examples may differ from what is described with respect to FIG. 7.

Figure 8:
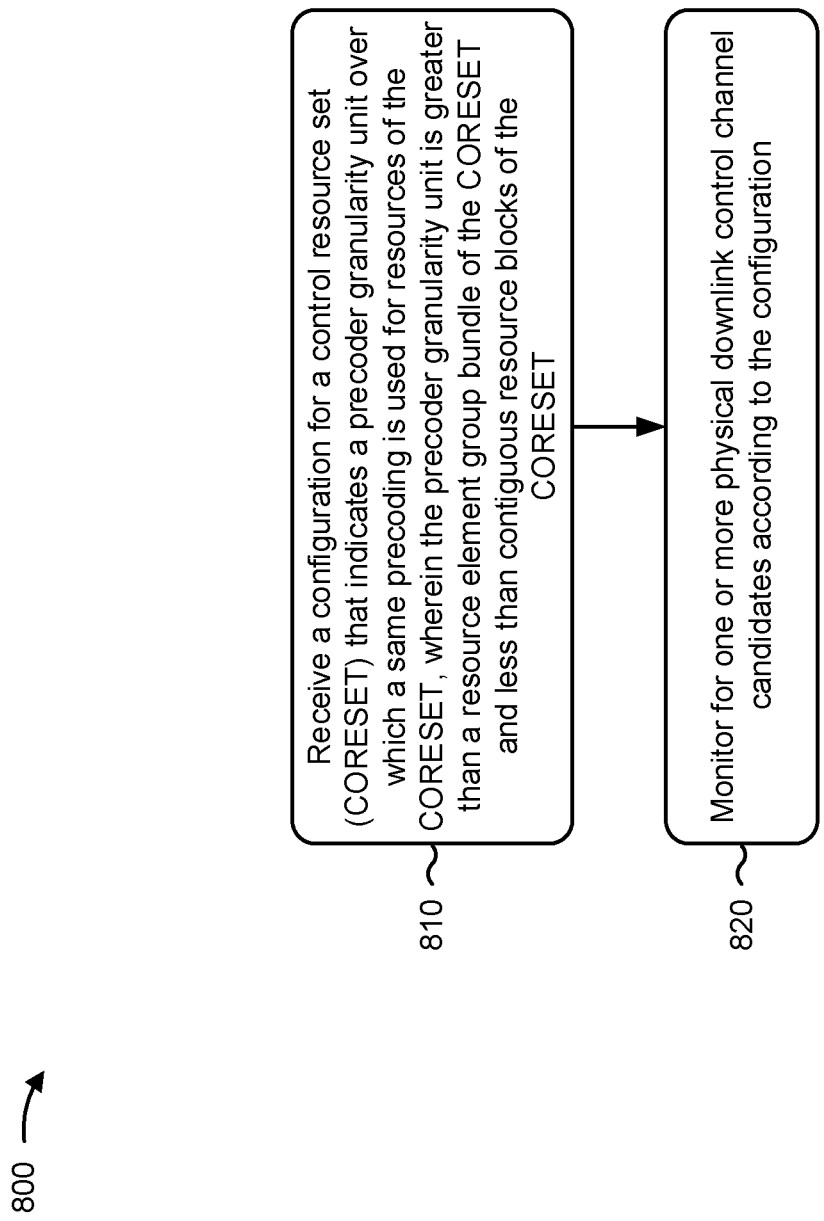
FIG. 8 is a diagram illustrating an example process performed, for example, by a UE, in accordance with various aspects of the present disclosure.

FIG. 8 is a diagram illustrating an example process 800 performed, for example, by a UE, in accordance with various aspects of the present disclosure. Example process 800 is an example where the UE (e.g., UE 120, and/or the like) performs operations associated with CORESET precoding indication.

As shown in FIG. 8, in some aspects, process 800 may include receiving a configuration for a CORESET that indicates a precoder granularity unit over which a same precoding is used for resources of the CORESET, wherein the precoder granularity unit is greater than an REG bundle of the CORESET and less than contiguous resource blocks of the CORESET (block 810). For example, the UE (e.g., using antenna 252, DEMOD 254, MIMO detector 256, receive processor 258, controller/processor 280, and/or the like) may receive a configuration for a CORESET that indicates a precoder granularity unit over which a same precoding is used for resources of the CORESET, as described above. In some aspects, the precoder granularity unit is greater than an REG bundle of the CORESET and less than contiguous resource blocks of the CORESET.

As further shown in FIG. 8, in some aspects, process 800 may include monitoring for one or more PDCCH candidates according to the configuration (block 820). For example, the UE (e.g., using antenna 252, DEMOD 254, MIMO detector 256, receive processor 258, controller/processor 280, and/or the like) may monitor for one or more PDCCH candidates according to the configuration, as described above.

Process 800 may include additional aspects, such as any single aspect or any combination of aspects described below and/or in connection with one or more other processes described elsewhere herein.

In a first aspect, the precoder granularity unit is a PDCCH candidate associated with a particular aggregation level. In a second aspect, alone or in combination with the first aspect, one or more REG bundles of a first PDCCH candidate associated with the particular aggregation level use a first precoding and one or more REG bundles of a second PDCCH candidate associated with the particular aggregation level use a second precoding. In a third aspect, alone or in combination with one or more of the first and second aspects, one or more REG bundles of a first PDCCH candidate associated with a first aggregation level use a first precoding and one or more REG bundles of a second PDCCH candidate associated with a second aggregation level use a second precoding.

In a fourth aspect, alone or in combination with one or more of the first through third aspects, the precoder granularity unit is a PDCCH candidate associated with a lowest aggregation level, of one or more aggregation levels that are configured for a search space set of the CORESET, having a non-zero quantity of PDCCH candidates. In a fifth aspect, alone or in combination with one or more of the first through fourth aspects, process 800 includes determining one or more REG bundles, for which channel estimation is to be performed, based at least in part on the precoder granularity unit and a maximum quantity of PDCCH candidates that can be configured for the CORESET.

In a sixth aspect, alone or in combination with one or more of the first through fifth aspects, one or more REG bundles of a first PDCCH candidate associated with the lowest aggregation level use a first precoding and one or more REG bundles of a second PDCCH candidate associated with the lowest aggregation level use a second precoding. In a seventh aspect, alone or in combination with one or more of the first through sixth aspects, a plurality of REG bundles of a PDCCH candidate, associated with a higher aggregation level than the lowest aggregation level, do not use the same precoding. In an eighth aspect, alone or in combination with one or more of the first through seventh aspects, the plurality of REG bundles include a first set of REG bundles that are associated with a first PDCCH candidate associated with the lowest aggregation level, and a second set of REG bundles that are associated with a second PDCCH candidate associated with the lowest aggregation level.

In a ninth aspect, alone or in combination with one or more of the first through eighth aspects, the precoder granularity unit is resource block groups, within a particular bandwidth part, that are contiguously identified for the CORESET. In a tenth aspect, alone or in combination with one or more of the first through ninth aspects, the resource block groups are contiguously identified for the CORESET when consecutive bits, of a frequency domain resources bitmap for the CORESET, are set. In an eleventh aspect, alone or in combination with one or more of the first through tenth aspects, a first set of resource block groups that are contiguously identified for the CORESET use a first precoding and a second set of resource block groups that are contiguously identified for the CORESET use a second precoding.

In a twelfth aspect, alone or in combination with one or more of the first through eleventh aspects, one or more REG bundles, of a PDCCH candidate, associated with a first set of resource block groups that are contiguously identified for the CORESET, use a first precoding, and one or more REG bundles, of the PDCCH candidate, associated with a second set of resource block groups that are contiguously identified for the CORESET, use a second precoding.

In a thirteenth aspect, alone or in combination with one or more of the first through twelfth aspects, one or more REG bundles of a PDCCH candidate use the same precoding when the one or more REG bundles are adjacent in a frequency domain or have frequency separations that satisfy a threshold value. In a fourteenth aspect, alone or in combination with one or more of the first through thirteenth aspects, the one or more REG bundles of the PDCCH candidate use the same precoding when the one or more REG bundles are configured with a cyclic shift.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
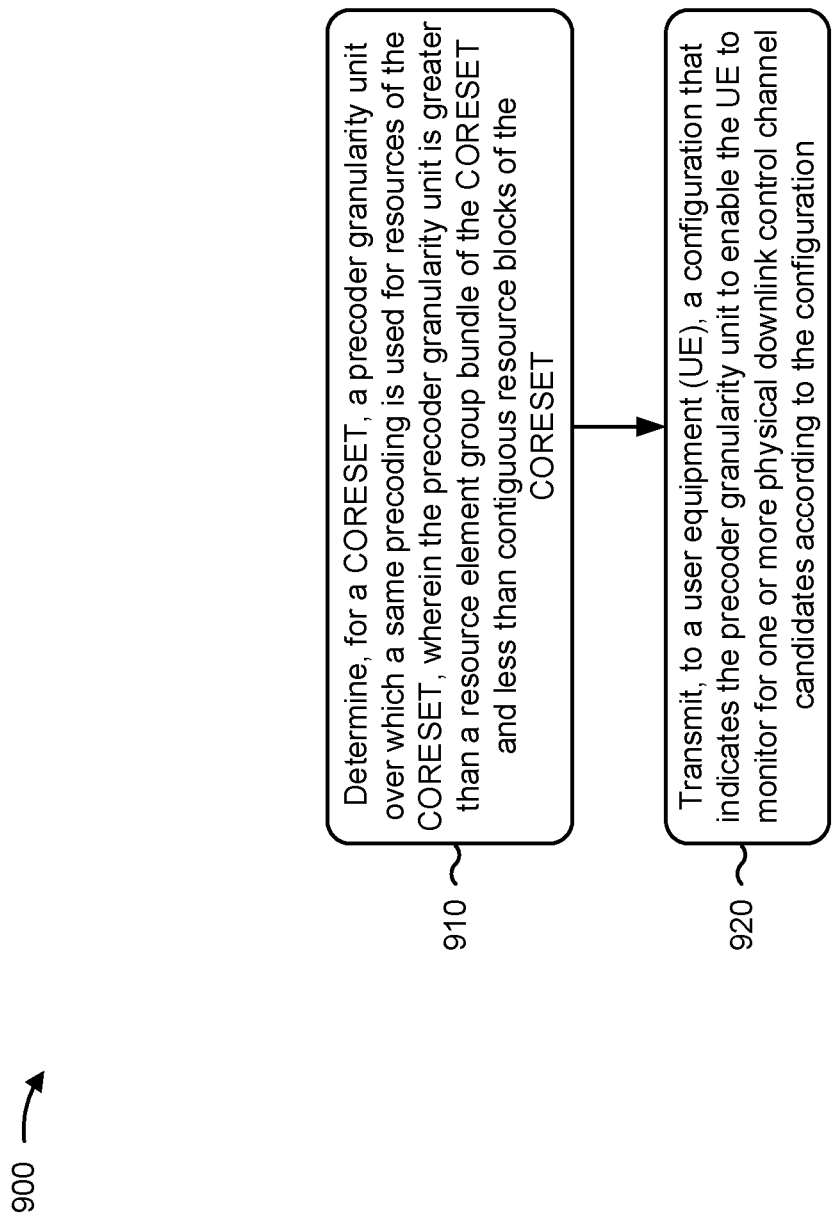
FIG. 9 is a diagram illustrating an example process performed, for example, by a BS, in accordance with various aspects of the present disclosure.

FIG. 9 is a diagram illustrating an example process 900 performed, for example, by a BS, in accordance with various aspects of the present disclosure. Example process 900 is an example where the BS (e.g., BS 110, and/or the like) performs operations associated with CORESET precoding indication.

As shown in FIG. 9, in some aspects, process 900 may include determining, for a CORESET, a precoder granularity unit over which a same precoding is used for resources of the CORESET, wherein the precoder granularity unit is greater than an REG bundle of the CORESET and less than contiguous resource blocks of the CORESET (block 910). For example, the BS (e.g., using controller/processor 240 and/or the like) may determine, for a CORESET, a precoder granularity unit over which a same precoding is used for resources of the CORESET, as described above. In some aspects, the precoder granularity unit is greater than an REG bundle of the CORESET and less than contiguous resource blocks of the CORESET.

As further shown in FIG. 9, in some aspects, process 900 may include transmitting, to a UE, a configuration that indicates the precoder granularity unit, to enable the UE to monitor for one or more PDCCH candidates according to the configuration (block 920). For example, the BS (e.g., using controller/processor 240, transmit processor 220, TX MIMO processor 230, MOD 232, antenna 234, and/or the like) may transmit, to a UE, a configuration that indicates the precoder granularity unit to enable the UE to monitor for one or more PDCCH candidates according to the configuration, as described above.

Process 900 may include additional aspects, such as any single aspect or any combination of aspects described below and/or in connection with one or more other processes described elsewhere herein.

In a first aspect, the precoder granularity unit is a PDCCH candidate associated with a particular aggregation level. In a second aspect, alone or in combination with the first aspect, one or more REG bundles of a first PDCCH candidate associated with the particular aggregation level use a first precoding and one or more REG bundles of a second PDCCH candidate associated with the particular aggregation level use a second precoding. In a third aspect, alone or in combination with one or more of the first and second aspects, one or more REG bundles of a first PDCCH candidate associated with a first aggregation level use a first precoding and one or more REG bundles of a second PDCCH candidate associated with a second aggregation level use a second precoding.

In a fourth aspect, alone or in combination with one or more of the first through third aspects, the precoder granularity unit is a PDCCH candidate associated with a lowest aggregation level, of one or more aggregation levels that are configured for a search space set of the CORESET, having a non-zero quantity of PDCCH candidates. In a fifth aspect, alone or in combination with one or more of the first through fourth aspects, one or more REG bundles of a first PDCCH candidate associated with the lowest aggregation level use a first precoding and one or more REG bundles of a second PDCCH candidate associated with the lowest aggregation level use a second precoding.

In a sixth aspect, alone or in combination with one or more of the first through fifth aspects, a plurality of REG bundles of a PDCCH candidate associated with a higher aggregation level than the lowest aggregation level do not use the same precoding. In a seventh aspect, alone or in combination with one or more of the first through sixth aspects, the plurality of REG bundles include a first set of REG bundles that are associated with a first PDCCH candidate associated with the lowest aggregation level, and a second set of REG bundles that are associated with a second PDCCH candidate associated with the lowest aggregation level.

In an eighth aspect, alone or in combination with one or more of the first through seventh aspects, the precoder granularity unit is resource block groups, within a particular bandwidth part, that are contiguously identified for the CORESET. In a ninth aspect, alone or in combination with one or more of the first through eighth aspects, the resource block groups are contiguously identified for the CORESET when consecutive bits, of a frequency domain resources bitmap for the CORESET, are set. In a tenth aspect, alone or in combination with one or more of the first through ninth aspects, a first set of resource block groups that are contiguously identified for the CORESET use a first precoding and a second set of resource block groups that are contiguously identified for the CORESET use a second precoding.

In an eleventh aspect, alone or in combination with one or more of the first through tenth aspects, one or more REG bundles, of a PDCCH candidate, associated with a first set of resource block groups that are contiguously identified for the CORESET, use a first precoding, and one or more REG bundles, of the PDCCH candidate, associated with a second set of resource block groups that are contiguously identified for the CORESET, use a second precoding.

In a twelfth aspect, alone or in combination with one or more of the first through eleventh aspects, one or more REG bundles of a PDCCH candidate use the same precoding when the one or more REG bundles are adjacent in a frequency domain or have frequency separations that satisfy a threshold value. In a thirteenth aspect, alone or in combination with one or more of the first through twelfth aspects, the one or more REG bundles of the PDCCH candidate use the same precoding when the one or more REG bundles are configured with a cyclic shift.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed:

1. A method of wireless communication performed by a user equipment (UE), comprising:
   receiving a configuration for a control resource set (CORESET) that indicates a precoder granularity unit over which a same precoding is used for resources of the CORESET,
      wherein the precoder granularity unit is greater than a resource element group (REG) bundle of the CORESET and less than contiguous resource blocks of the CORESET; and
   monitoring for one or more physical downlink control channel (PDCCH) candidates according to the configuration,
      wherein the precoder granularity unit is a PDCCH candidate associated with a lowest aggregation level, of one or more aggregation levels that are configured for a search space set of the CORESET, having a non-zero quantity of PDCCH candidates.

2. The method of claim 1, further comprising:
   determining one or more REG bundles, for which channel estimation is to be performed, based at least in part on the precoder granularity unit and a maximum quantity of PDCCH candidates that can be configured for the CORESET.

3. The method of claim 1,
   wherein one or more REG bundles of a first PDCCH candidate associated with the lowest aggregation level use a first precoding and one or more REG bundles of a second PDCCH candidate associated with the lowest aggregation level use a second precoding.

4. The method of claim 1,
   wherein a plurality of REG bundles of a PDCCH candidate, associated with a higher aggregation level than the lowest aggregation level, do not use the same precoding.

5. The method of claim 4,
   wherein the plurality of REG bundles include a first set of REG bundles that are associated with a first PDCCH candidate associated with the lowest aggregation level, and a second set of REG bundles that are associated with a second PDCCH candidate associated with the lowest aggregation level, and
   wherein the first set of REG bundles use a first precoding, and the second set of REG bundles use a second precoding.

6. The method of claim 1,
   wherein the precoder granularity unit is resource block groups, within a particular bandwidth part, that are contiguously identified for the CORESET.

7. The method of claim 6,
   wherein the resource block groups are contiguously identified for the CORESET when consecutive bits, of a frequency domain resources bitmap for the CORESET, are set.

8. The method of claim 6,
   wherein a first set of resource block groups that are contiguously identified for the CORESET use a first precoding and a second set of resource block groups that are contiguously identified for the CORESET use a second precoding.

9. The method of claim 6,
   wherein one or more REG bundles, of a PDCCH candidate, associated with a first set of resource block groups that are contiguously identified for the CORESET, use a first precoding, and one or more REG bundles, of the PDCCH candidate, associated with a second set of resource block groups that are contiguously identified for the CORESET, use a second precoding.

10. The method of claim 1,
    wherein one or more REG bundles of a PDCCH candidate use the same precoding when the one or more REG bundles are adjacent in a frequency domain or have frequency separations that satisfy a threshold value.

11. The method of claim 10,
    wherein the one or more REG bundles of the PDCCH candidate use the same precoding when the one or more REG bundles are configured with a cyclic shift.

12. A method of wireless communication performed by a base station, comprising:
    determining, for a control resource set (CORESET), a precoder granularity unit over which a same precoding is used for resources of the CORESET,
       wherein the precoder granularity unit is greater than a resource element group (REG) bundle of the CORESET and less than contiguous resource blocks of the CORESET; and
    transmitting, to a user equipment (UE), a configuration that indicates the precoder granularity unit, to enable the UE to monitor for one or more physical downlink control channel (PDCCH) candidates according to the configuration,
       wherein the precoder granularity unit is a PDCCH candidate associated with a lowest aggregation level, of one or more aggregation levels that are configured for a search space set of the CORESET, having a non-zero quantity of PDCCH candidates.

13. The method of claim 12,
    wherein one or more REG bundles of a first PDCCH candidate associated with the lowest aggregation level use a first precoding and one or more REG bundles of a second PDCCH candidate associated with the lowest aggregation level use a second precoding.

14. The method of claim 12,
    wherein a plurality of REG bundles of a PDCCH candidate associated with a higher aggregation level than the lowest aggregation level do not use the same precoding.

15. The method of claim 14,
    wherein the plurality of REG bundles include a first set of REG bundles that are associated with a first PDCCH candidate associated with the lowest aggregation level, and a second set of REG bundles that are associated with a second PDCCH candidate associated with the lowest aggregation level, and
    wherein the first set of REG bundles use a first precoding, and the second set of REG bundles use a second precoding.

16. The method of claim 12,
    wherein the precoder granularity unit is resource block groups, within a particular bandwidth part, that are contiguously identified for the CORESET.

17. The method of claim 16,
wherein a first set of resource block groups that are contiguously identified for the CORESET use a first precoding and a second set of resource block groups that are contiguously identified for the CORESET use a second precoding.

18. The method of claim 16,
wherein one or more REG bundles, of a PDCCH candidate, associated with a first set of resource block groups that are contiguously identified for the CORESET, use a first precoding, and one or more REG bundles, of the PDCCH candidate, associated with a second set of resource block groups that are contiguously identified for the CORESET, use a second precoding.

19. The method of claim 12,
wherein one or more REG bundles of a PDCCH candidate use the same precoding when the one or more REG bundles are adjacent in a frequency domain or have frequency separations that satisfy a threshold value.

20. The method of claim 19,
wherein the one or more REG bundles of the PDCCH candidate use the same precoding when the one or more REG bundles are configured with a cyclic shift.

21. A user equipment (UE) for wireless communication, comprising:
one or more memories; and
one or more processors, coupled to the one or more memories, configured to:
receive a configuration for a control resource set (CORESET) that indicates a precoder granularity unit over which a same precoding is used for resources of the CORESET,
wherein the precoder granularity unit is greater than a resource element group (REG) bundle of the CORESET and less than contiguous resource blocks of the CORESET; and
monitor for one or more physical downlink control channel (PDCCH) candidates according to the configuration,
wherein the precoder granularity unit is a PDCCH candidate associated with a lowest aggregation level, of one or more aggregation levels that are configured for a search space set of the CORESET, having a non-zero quantity of PDCCH candidates.

22. A base station for wireless communication, comprising:
a memory; and
one or more processors, coupled to the memory, configured to:
determine, for a control resource set (CORESET), a precoder granularity unit over which a same precoding is used for resources of the CORESET,
wherein the precoder granularity unit is greater than a resource element group (REG) bundle of the CORESET and less than contiguous resource blocks of the CORESET; and
transmit, to a user equipment (UE), a configuration that indicates the precoder granularity unit, to enable the UE to monitor for one or more physical downlink control channel (PDCCH) candidates according to the configuration,
wherein the precoder granularity unit is a PDCCH candidate associated with a lowest aggregation level, of one or more aggregation levels that are configured for a search space set of the CORESET, having a non-zero quantity of PDCCH candidates.

23. The method of claim 1,
wherein one or more REG bundles of a first PDCCH candidate associated with a first aggregation level use a first precoding and one or more REG bundles of a second PDCCH candidate associated with a second aggregation level use a second precoding.

24. The method of claim 12,
wherein one or more REG bundles of a first PDCCH candidate associated with a first aggregation level use a first precoding and one or more REG bundles of a second PDCCH candidate associated with a second aggregation level use a second precoding.

25. The UE of claim 21, wherein the one or more processors are further configured to:
determine one or more REG bundles, for which channel estimation is to be performed, based at least in part on the precoder granularity unit and a maximum quantity of PDCCH candidates that can be configured for the CORESET.

26. The UE of claim 21,
wherein one or more REG bundles of a first PDCCH candidate associated with the lowest aggregation level use a first precoding and one or more REG bundles of a second PDCCH candidate associated with the lowest aggregation level use a second precoding.

27. The UE of claim 21,
wherein a plurality of REG bundles of a PDCCH candidate, associated with a higher aggregation level than the lowest aggregation level, do not use the same precoding.

28. The base station of claim 22,
wherein one or more REG bundles of a first PDCCH candidate associated with the lowest aggregation level use a first precoding and one or more REG bundles of a second PDCCH candidate associated with the lowest aggregation level use a second precoding.

29. The base station of claim 22,
wherein a plurality of REG bundles of a PDCCH candidate associated with a higher aggregation level than the lowest aggregation level do not use the same precoding.

30. The base station of claim 22,
wherein the precoder granularity unit is resource block groups, within a particular bandwidth part, that are contiguously identified for the CORESET.

* * * * *